UNITED STATES PATENT OFFICE.

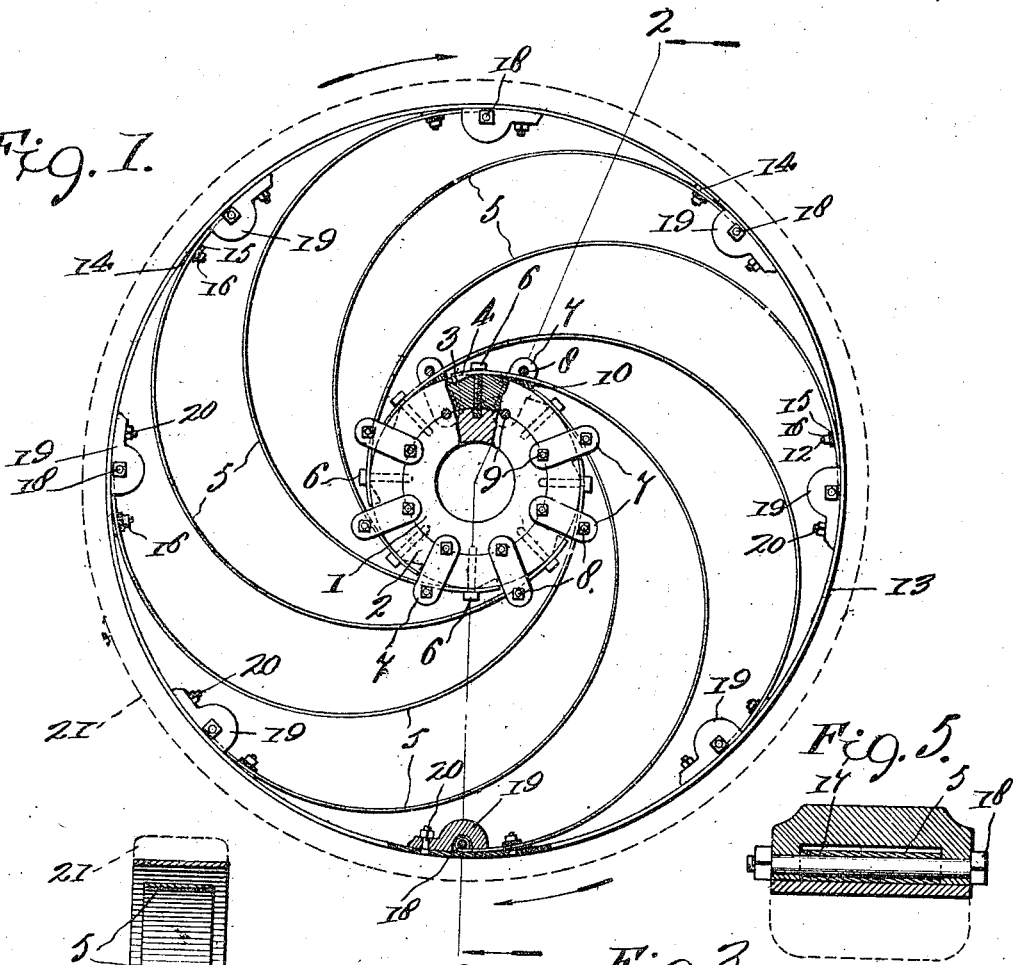

GEORGE T. PAYNE, OF MOBILE, ALABAMA.

RESILIENT WHEEL.

1,286,761.  Specification of Letters Patent.  Patented Dec. 3, 1918.

Application filed April 3, 1918. Serial No. 226,492.

*To all whom it may concern:*

Be it known that I, GEORGE T. PAYNE, a citizen of the United States, residing at Mobile, in the county of Mobile and State of Alabama, have invented certain new and useful Improvements in Resilient Wheels; and I do hereby declare the following to be a full, clear, and exact description of the invention, such as will enable others skilled in the art to which it appertains to make and use the same.

My present invention relates to improvements in resilient wheels, and it is intended to provide a resilient wheel in which the yielding effect is produced by springs connecting the hub with the outer rim, as will be hereinafter more fully described.

The wheel may be used with or without a solid rubber tire mounted on the outer rim.

The invention is intended to provide a wheel of suitable resiliency which may be used in place of the wheels provided with pneumatic or rubber tires as now generally in use.

My invention will be more fully understood after reference to the accompanying drawings, in which:

Figure 1 shows a side elevation of the complete wheel, parts being broken away.

Fig. 2 shows a section along the broken line 2—2 of Fig. 1, and looking in the direction of the arrows.

Fig. 3 is an enlarged detail view showing the means of connecting the outer end of the spring spoke with the rim of the wheel, the parts being shown in section.

Fig. 4 is a plan view of the device shown in Fig. 3; and

Fig. 5 shows a section along the line 5—5 of Fig. 3, and looking in the direction of the arrows.

1 represents the hub of the wheel, which may be of any desired construction, and mounted on which hub is the sleeve or band 2 which is provided with notches 3 to engage the enlarged ends 4 of the spring spokes 5.

The inner ends of these spokes are fastened to the band 2 and the hub 1 by means of the screw bolts 6, which bolts also serve to fasten the band 2 securely on the hub 1. I provide links 7 connected together by the bolts 8 and 9, which bolts 9 serve as spline bolts for the hub 1 and the band 2.

Mounted between the spring spokes 5 and the band 2, and held under compression, are rubber fillers 10 which press the spokes firmly against the bolts 8 and prevent the spokes from rattling. These rubber fillers also serve as bearings for the spring spokes, as will be hereinafter more fully described.

The spring spokes 5 are slotted near their outer ends, as at 11, to permit the passage therethrough of the screw bolts 12, which pass through the outer rim 13, as shown in Fig. 3, and also through a rubber filler 14. Secured on these bolts 12 are spring washers 15 and a nut 16 so that the outer ends of the spring spokes 5 may be held firmly and securely against the rubber filler 14, and thus afford a second bearing for the spring spokes.

By the arrangement of the links 7, and the outer bolts 12, the spring spokes are kept in alinement so that the wheel will be maintained in a vertical position.

The outer end of the spokes 5 is preferably curved as at 17 to engage the bolts 18 (see Figs. 3 and 5), which bolts are mounted in the metal block 19 which is secured to the outer rim 13 by means of the angular bolts 20 which pass through the rim 13, as shown in Fig. 3.

The wheel may be used without a tire and would afford sufficient resiliency for all practical purposes; but where a tire is desired a solid rubber tire 21 may be applied as indicated in dotted lines. The principal use of such tire would be to obviate noise rather than to add any special resiliency to the completed wheel.

It will be seen that the notched ends 4 of the spring spokes will be held firmly in the band 2, and this band will be locked firmly on the hub 1, and the spring spokes will be held against lateral displacement by means of the links 7 and the bolts 12; and that rattling will be prevented by means of the rubber fillers 10 and 14.

The direction of the periphery of the wheel when going ahead should preferably be in the direction of the arrows, so that any reaction of the ground on the wheel would tend to press endwise against the spring spokes, tending to stiffen the wheel; but when it strikes an obstruction in the road the springs will readily yield in a vertical direction. Since the backing will always be done at a low rate of speed, it is not so important to have the stiffness of the spokes opposed to the backing movement of the wheel.

Instead of having a single row of spokes, as shown, it will be obvious that the hub may be lengthened and two or more rows of spokes may be provided if desired. This is especially desirable for heavy traffic, but the details of the invention would not be varied except by multiplying the parts. The same effect might be obtained by making the spokes and the rim heavier.

It will be noted that the spokes 5 are semicircular leaf springs, and that the bearing on the hub is on the opposite side of the axle from the bearing on the rim of the wheel, whereby a series of long, curved, resilient strips are interposed between the rim and the hub.

It will thus be seen that I provide a resilient wheel which is rugged, durable, not liable to get out of order, does not rattle, is strong against ordinary draft strains and yet yields to encountering obstacles on the road, and which cannot be affected or impaired by any such accidents as punctures, or the like.

It will be obvious that various modifications might be made in the herein described structure, and in the construction, combination and arrangement of parts which could be used without departing from the spirit of my invention; and I do not mean to limit the invention to any such details of construction except as particularly pointed out in the claims.

Having thus described my invention what I claim and desire to secure by Letters Patent of the United States is:—

1. A resilient wheel comprising a hub, a band secured thereon, an annular metal rim, and a series of curved resilient spokes, each in the form of semicircular leaf springs, bolted through said band and to said rim, with guides for said spokes connected to said band, comprising links secured to each side of said band and pairs of bolts passing through said links, the outer bolt of each pair engaging the outer face of each spoke, and the inner bolt passing inside said band, and resilient fillers held under compression between said links and spokes and said band, substantially as described.

2. A resilient wheel comprising a hub, a band secured thereon, an annular metal rim, and a series of curved resilient spokes, each in the form of a semicircular leaf spring, connecting said band and said rim, each of said spokes being slotted near its outer end and provided with an engaging eye at the outer end, metal blocks bolted to the inner face of said rim beyond the outer ends of said spokes, and each provided with a transverse pin engaging the eye in the corresponding spoke, resilient fillers mounted between said slotted portions of said spokes and said rim, and bolts passing through said slots, said fillers and said rim and having spring washers with nuts holding said spokes to said rim and compressing said resilient fillers, substantially as described.

In testimony whereof, I affix my signature.

GEO. T. PAYNE.